United States Patent
Hamamura et al.

[19]
[11] Patent Number: 6,147,468
[45] Date of Patent: Nov. 14, 2000

[54] SERVO CONTROL METHOD FOR ORBITAL MACHINING WITH CUTTING TOOL AND SERVO CONTROL SYSTEM FOR ORBITAL MACHINING

[75] Inventors: Minoru Hamamura; Sadaji Hayama; Jun Fujita; Takahiro Funaki, all of Shizuoka-ken, Japan

[73] Assignee: Toshiba Kikai Kabushiki Kaisha, Tokyo, Japan

[21] Appl. No.: 09/301,304

[22] Filed: Apr. 29, 1999

[30] Foreign Application Priority Data

Apr. 30, 1998 [JP] Japan .................................. 10-121204

[51] Int. Cl.⁷ .................................................. G05B 11/32
[52] U.S. Cl. .......................... 318/625; 700/189; 318/569; 318/632
[58] Field of Search ................................ 318/625, 568.2, 318/568.22, 570, 632, 600–602, 569–574; 700/43–45, 186–195

[56] References Cited

U.S. PATENT DOCUMENTS

| | | | |
|---|---|---|---|
| 4,879,660 | 11/1989 | Asakura et al. | 364/474.15 |
| 4,983,899 | 1/1991 | Komatsu et al. | 318/571 |
| 5,184,053 | 2/1993 | Maruo et al. | 318/571 |
| 5,713,253 | 2/1998 | Date et al. | 82/1.11 |
| 5,920,169 | 7/1999 | Hamamura et al. | 318/561 |
| 5,936,366 | 8/1999 | Hamamura et al. | 318/560 |
| 5,952,804 | 9/1999 | Hamamura et al. | 318/560 |

FOREIGN PATENT DOCUMENTS 8-126938  5/1996  Japan .

*Primary Examiner*—David Martin
*Assistant Examiner*—Rina I. Duda
*Attorney, Agent, or Firm*—Finnegan, Henderson, Farabow, Garrett & Dunner, L.L.P.

[57] ABSTRACT

For an orbital machining in which a spindle having a cutting tool attached thereto and a work to be machined are moved, by feed shaft control, to make a relative displacement to each other along a plane perpendicular to an axis of rotation of the spindle, such that a mutual interpolation motion is achieved between the spindle and the work, and a rotation angle of the spindle is controlled quantitatively and synchronously to have a predetermined correlation to the shaft control so that, at any angular position in rotation of the spindle, a blade direction of the cutting tool is maintained in a preset direction to thereby achieve a cutting into a configuration to be defined by an interpolation locus based on the mutual interpolation motion, there is effected a combination of feed-forward compensation for a follow-up delay in control of a motor servo system of a respective feed shaft and for a follow-up delay in control of a motor servo system of the spindle.

18 Claims, 5 Drawing Sheets

PRIOR ART

SERVO CONTROL METHOD FOR ORBITAL MACHINING WITH CUTTING TOOL AND SERVO CONTROL SYSTEM FOR ORBITAL MACHINING

BACKGROUND OF THE INVENTION

1. Field of the Invention

The present invention relates to a servo control method for an orbital machining with a cutting tool, and a servo control system for an orbital machining. More particularly, the invention relates to a servo control method for an orbital machining with a cutting tool using an NC (numerical control) machine tool having a simultaneous multiple-axes control function, and a servo control system for an orbital machining.

2. Description of Relevant Art

As a machining method for effectively performing, by way of a rotary cutting, a machining of a hole with an arbitrary inside diameter and a machining of an outer circumferential surface with an arbitrary outside diameter, as well as a taper machining, a spherical surface machining, a polygonal machining, a thread machining, a flange face machining, and a voluntary shape machining, by using a single cutting tool, irrespective of a radius (a tool diameter) of the cutting tool, there has been proposed in Japanese Patent Application Laid-Open Publication No. 8-126938 (in a family including Korean Patent Publication No. 180954 and U.S. Pat. No. 5,713,253) an orbital machining in which a spindle having a cutting tool attached thereto and a work to be machined are moved, by feed shaft control, to make a relative displacement to each other along a plane perpendicular to an axis of rotation of the spindle, such that a mutual interpolation motion is achieved between the spindle and the work, and a rotation angle of the spindle is controlled quantitatively and synchronously to have a predetermined correlation to the shaft control so that, at all angular positions in rotation of the spindle, a blade direction of the cutting tool is maintained in a preset direction to thereby achieve a cutting into a configuration to be defined by an interpolation locus based on the mutual interpolation motion.

For such an orbital machining, there is employed a general-purpose NC machine tool which has a simultaneous multiple-axes control function and in which a spindle and feed shafts are controlled by servo motors.

In the servo control, there are developed control follow-up delays in motor servo systems of the feed shafts in dependence on their positional gains. As a feed speed becomes higher, a corresponding control follow-up delay becomes significant, and causes an error to normally occur in a feed position, or a reduction of cutting radius to be accompanied in a boring, so that the machining does not comply with an associated command value.

To this point, it may be proposed to make a feed-forward compensation for a control follow-up delay in a motor servo system of a feed shaft by adding, to a positional command value of the feed shaft, a feed-forward compensation value determined by such a calculation that (a differential value of the positional command value)/(a position loop gain of the feed shaft motor servo system).

If feed-forward compensations are effected for control follow-up delays in motor servo systems of feed shafts, then loci of (interpolation) motions of a work relative to a spindle can be compensated to be complaint with command values. However, there still remains a control follow-up delay in a motor servo system for control of a rotation angle of a spindle, and there occurs such a situation that control follow-up delays of the motor servo systems of the feed shafts are eliminated by feed-forward compensations while a control follow-up delay is left in the motor servo system for rotation angle control of the spindle, whereby a synchronization collapses between feed shaft control and spindle rotation angle control, so that an angular motion in rotation of the spindle delays relative to a circular interpolation motion of the machine, with a result that a cut dimension has an error, or a reduction of cutting radius occurs in a boring, and a high-precision orbital machining is difficult.

Further, the machine tool has, in its mechanical system, errors due to elastic deformations caused by inertial forces of a system of feed shafts and a spindle, and such errors increase, as feed speeds of the shafts, a rotation speed of the spindle and/or their accelerations (or decelerations) become higher, whereby also the precision of orbital machining is lowered.

SUMMARY OF THE INVENTION

The present invention has been achieved with such points in view.

It therefore is an object of the present invention to provide a servo control method for an orbital machining with a cutting tool and a servo control system for an orbital machining, which can eliminate a collapse of a synchronization between feed shaft control and spindle rotation angle control and cancel errors of a mechanical system due to elastic deformations caused by inertial forces such as of feed shafts or spindle, to thereby achieve a high-speed, high-precision orbital machining.

To achieve the object, an aspect of the invention provides a servo control method comprising the steps of controlling a first servo motor for moving a feed shaft to feed a work, controlling a second servo motor for moving a spindle having a cutting tool attached thereto for an orbital machining of the work, compensating for a first follow-up delay in the control of the first servo motor, in a feed forward manner, and compensating for a second follow-up delay in the control of the second servo motor, in a feed forward manner.

According to this aspect of the invention, there can be secured a synchronization between a feed shaft control and a spindle rotation angle control, which permits a cancellation of mechanical errors.

Further, to achieve the object described, another aspect of the invention provides a servo control system comprising a first controller for controlling a first servo motor for moving a feed shaft to feed a work, a second controller for controlling a second servo motor for moving a spindle having a cutting tool attached thereto for an orbital machining of the work, a first compensator for compensating for a first follow-up delay in control of the first servo motor, in a feed forward manner, and a second compensator for compensating for a second follow-up delay in control of the second servo motor, in a feed forward manner.

According to this aspect also, there can be secured a synchronization between a feed shaft control and a spindle rotation angle control, that permits a cancellation of mechanical errors.

BRIEF DESCRIPTION OF THE ACCOMPANYING DRAWINGS

The above and further objects and novel features of the present invention will more fully appear from the following detail description when the same is read in conjunction with the accompanying drawings, in which.

DETAILED DESCRIPTION OF THE PREFERRED EMBODIMENTS

Figure 1:
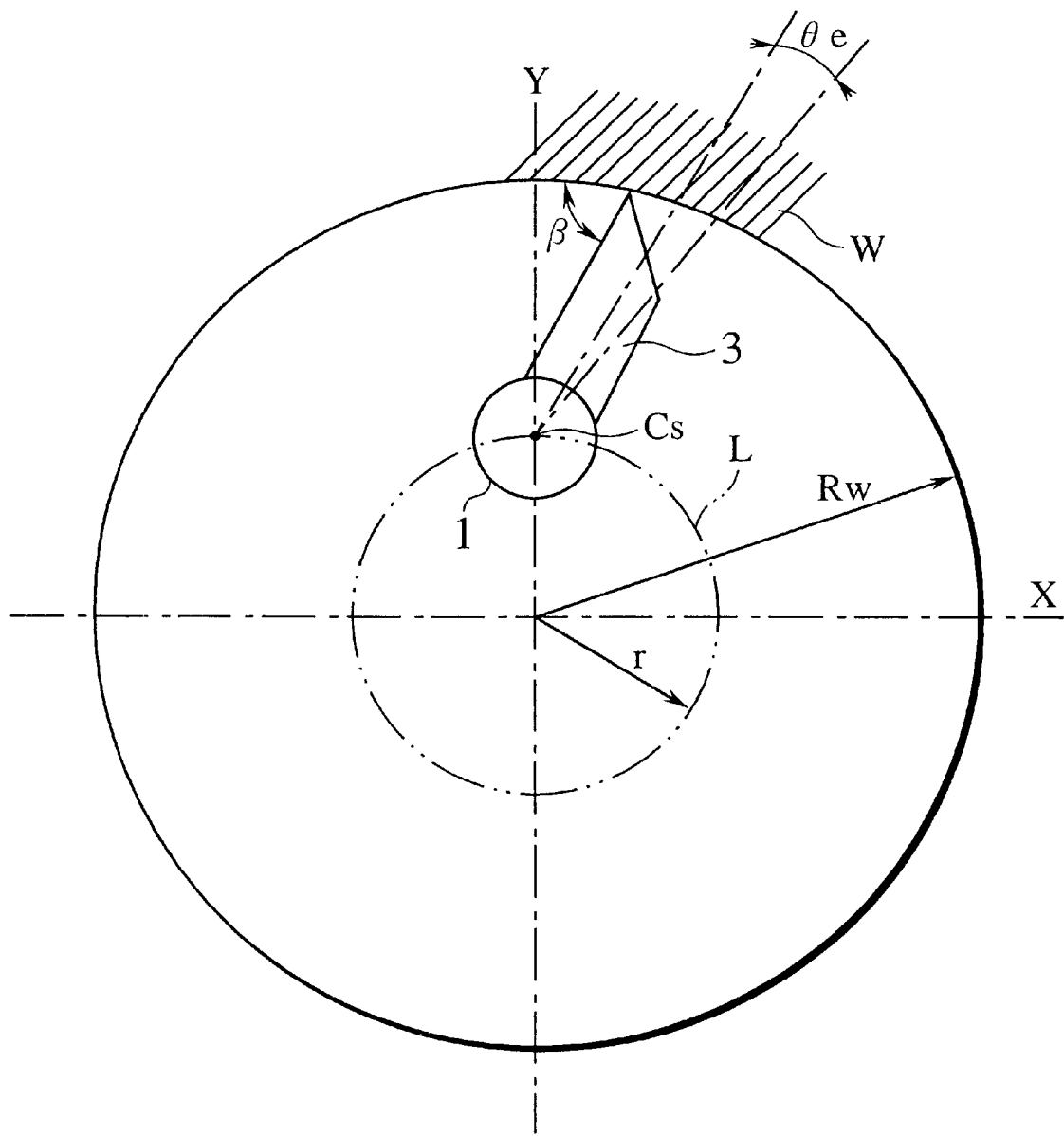
FIG. 1 is a diagram illustrating a concept of an orbital machining.

There will be detailed below the preferred embodiments of the present invention with reference to the accompanying drawings. Like members are designated by like reference characters.

First, there will be described the concept of an orbital machining with reference to FIG. 1. In FIG. 1, designated by reference numeral 1 is a main spindle of which an angle of rotation about a central axis is quantitatively controllable, and 3 is a (single point) cutting tool fixed to the spindle 1.

The orbital machining is a machining in which, in order to cause a movement of a center Cs of the spindle 1 relative to a work W to trace a locus meeting a configuration to be cut, a feed shaft of the spindle 1 and respective feed shafts of the work W (for an X-axis feed and a Y-axis feed in this case) are controlled to thereby displace for spindle 1 and the work W relative to each other on a plane perpendicular to an axis of rotation of the spindle 1, such that a true circle is described by a mutual interpolation motion between the spindle 1 and the work W, and concurrently an angle of rotation of the spindle 1 is synchronously controlled relative to a combination of X-axis control and Y-axis control to thereby keep a predetermined correlation therebetween such that, at any angular positions in rotation of the spindle 1, a blade of a cutting tool 3 is maintained at a predetermined direction relative to an inner circumferential surface of the work W, i.e., such that an angle β between the blade and the internal circumferential surface is kept constant, whereby the work W is cut in a configuration determined by a similar interpolation locus L (the locus of the spindle center) due to the mutual interpolation motion, that is a cross-section shape defined by a true circle of a radius Rw as a distance from an apparent center to a cutting end of the blade.

Such an orbital machining is detailed in the family including the Japanese Patent Application Laid-Open Publication No. 8-126938, the Korean Patent No. 180954, and the U.S. Pat. No. 5,713,253, which is incorporated herein by reference. The present invention is applicable to various orbital machining systems and methods disclosed in the publications.

FIGS. 2–5 show a servo control system for an orbital machining according to an embodiment of the present invention.

Figure 2:
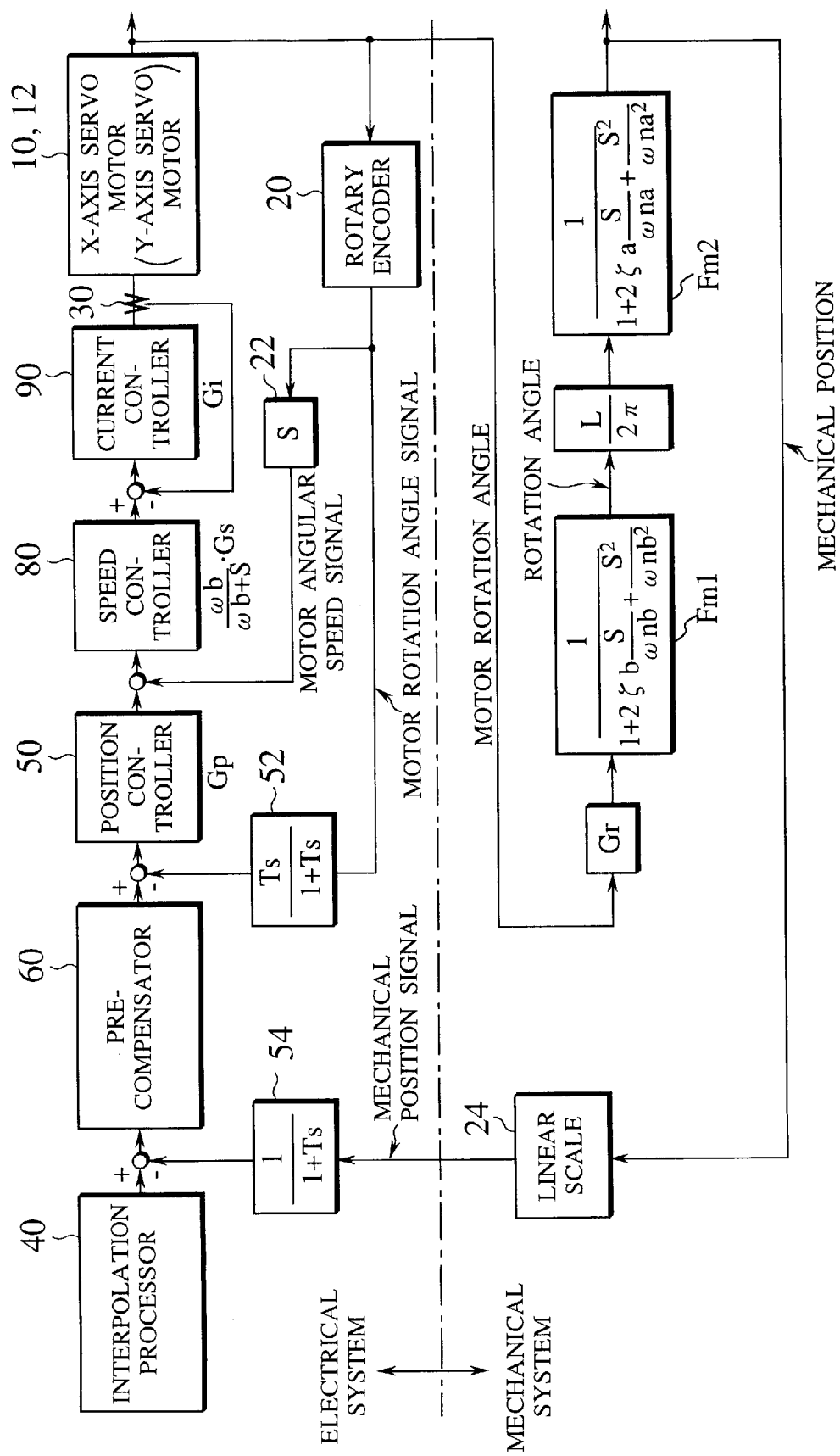
FIG. 2 is a common block diagram of X-axis and Y-axis control sections of a servo control system for an orbital machining according to an embodiment of the invention.

FIG. 2 commonly shows servo control sections for X-axis control and Y-axis control. They each include a position controller 50, a pre-compensator 60 as a means for feed-forward compensation in a motor servo system for an associated feed shaft (as part of a later-described mechanical system), a speed controller 80, a current controller 90, and a rotary encoder 20 for outputting a motor rotation angle signal of an X-axis servo motor 10 or a Y-axis servo motor 12.

The current controller 90 receives a current signal output from a current sensor 30, as a current feedback signal thereto, and constitutes a current loop having a current loop gain Gi.

The motor rotation angle signal output from the rotary encoder 20 is differentiated by a differentiator 22 to obtain a motor angular speed signal, which is given as a speed feedback signal to the speed controller 80. This controller 80 constitutes a speed loop having an incorporated low-pass filter ωb/(ωb+S) and a speed loop gain Gs.

The motor rotation angle signal from the rotary encoder 20 is passed through a low cut filter 52 for hybrid control, to be given as a motor angular position feedback signal to the position controller 50. This controller 50 constitutes a position loop having a position loop gain Gp.

A rotation of the X-axis servo motor 10 or the Y-axis servo motor 12 is transmitted through a gear reduction ratio Gr to a feed screw (not shown) of the feed shaft, which is thereby driven for rotation. If the servo motor is directly coupled to the feed screw, then Gr=1. The rotation of the feed screw is subjected to a transmission function Fm1 of a torsional system, to be given as a rotation angle of the feed screw. The rotation angle of the feed screw is input via a L/2 π to a moving system (with a movement in a X-axis direction or Y-axis direction), where L is a lead of the feed screw. The moving system has its transmission function Fm2 to determine a mechanical position.

For discussion of the transmission function Fm1, it is assumed that Jb represents a rotation moment of the feed screw, Kb represents a torsional rigidity for the elements to be driven for rotation (including a fraction of the torsional rigidity of an associated coupling), and Cb represents an equivalent rotational viscosity coefficient. With respect to torsional vibrations, a natural frequency ωnb can be expressed by an expression (1), and an attenuation constant ζb can be expressed by an expression (2), such that:

$$\omega nb = \sqrt{(Kb/Jb)} \qquad (1), \text{ and}$$

$$\zeta b = Cb \cdot \omega nb / 2 \qquad (2).$$

For discussion of the transmission function Fm2, it is assumed that Ka represents a rigidity of an associated movable mechanism (a rigidity in the direction of a straight line in the case of a linear movement and a torsional rigidity in the case of a rotational movement), Ma represents a mass of a linearly movable mechanism, Ja represents a moment of inertia of a rotatable mechanism, and Ca represents an equivalent viscosity coefficient thereof. With respect to a moving direction, a natural frequency ωna can be expressed by an expression (3) or (4), and an attenuation constant ζa can be expressed by an expression (5), such that:

$$\omega na = \sqrt{(Ka/Ma)} \qquad (3) \text{ or}$$

$$\omega na = \sqrt{(Ka/Ja)} \qquad (4), \text{ and}$$

$$\zeta a = Ca \cdot \omega na / 2 \qquad (5).$$

Then, the transmission function Fm1 of the torsional system is expressed by an expression (6), and the transmission function Fm2 of the moving system is expressed by an expression (7), such that:

$$1/\{1+2\zeta b(S/\omega nb)+(S^2/\omega nb^2)\} \quad (6)$$

$$1/\{1+2\zeta b(S/\omega na)+(S^2/\omega na^2)\} \quad (7),$$

where S is a Laplace operator.

A mechanical position of the moving system is detected by a linear scale 24, from which it is fed back as a mechanical position signal to an electrical system.

Figure 3:
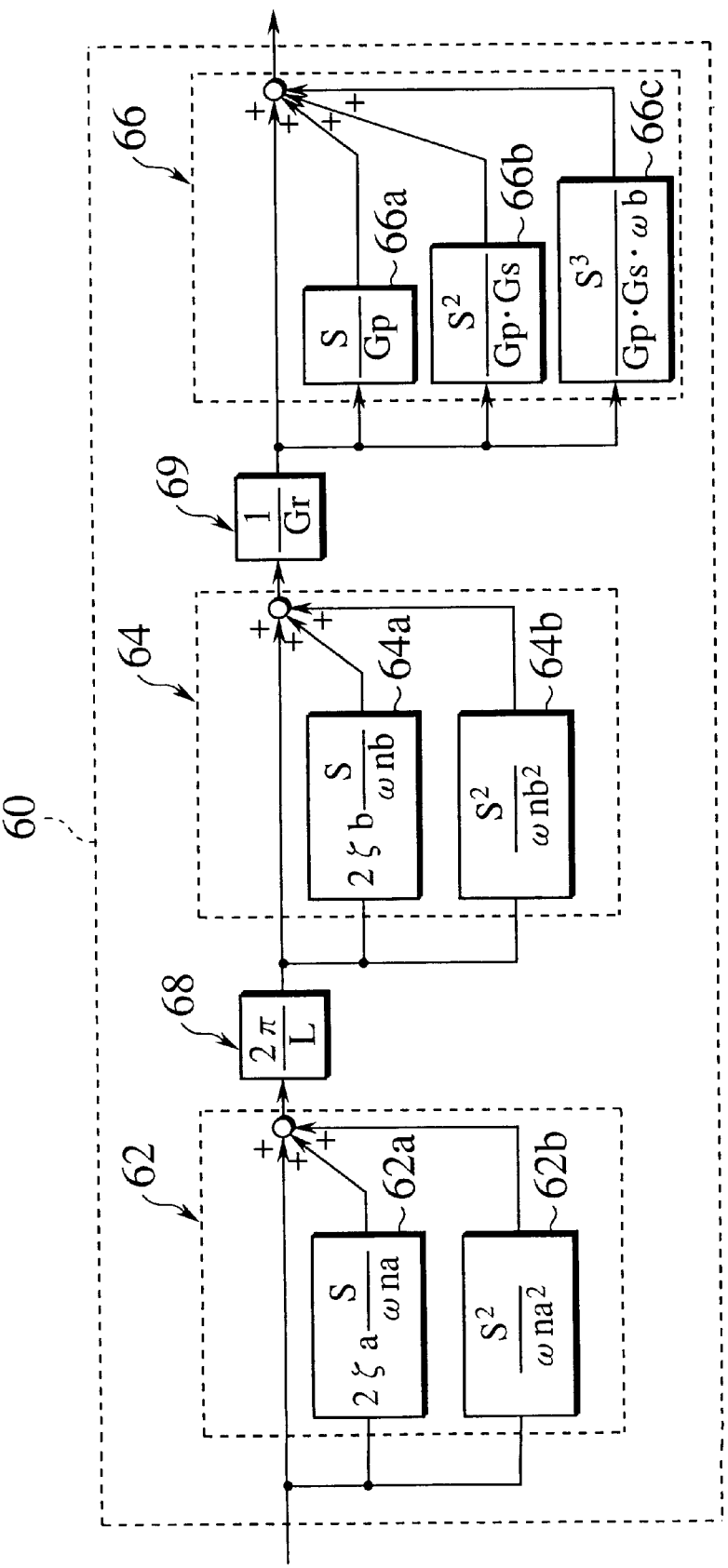
FIG. 3 is a common block diagram of essential components of the X-axis and Y-axis control sections of FIG. 2.

As shown in FIG. 3, the pre-compensator 60, which is a feed-forward compensation means for a motor servo system of the feed shaft, includes a first pre-compensator 62 for compensation for the moving system, a second pre-compensator 64 for compensation for the torsional system, and a third pre-compensator 66 for compensation for the motor servo system.

The third pre-compensator 66 comprises a feed-forward compensation operator 66a for a compensation operation of S/Gp to the motor servo system of feed shaft, a feed-forward compensation operator 66b for a compensation operation of $S^2/(Gp \cdot Gs)$ to the motor servo system, and a feed-forward compensation operator 66c for a compensation operation of $S^3/(Gp \cdot Gs \cdot \omega b)$ thereto, where ωb is a corner frequency of a low pass compensation filter incorporated in the speed controller 80. Respective feed-forward compensation values calculated by the operations of those feed-forward compensation operators 66a–66c are added to a motor rotation angle command.

By such a compensation of the third pre-compensation 66, there is a made a feed-forward compensation for a follow-up delay in control of the feed shaft motor servo system, so that the servo motor 10 or 12 is controlled at an angular position in accordance with an input signal to the pre-compensator 66.

The second pre-compensator 64, which is adapted to perform a feed-forward compensation depending on the transmission function Fm1 of the torsional system, has as an input variable thereto a positional command that is compensated in a feed forward manner at the pre-compensator 62 of the moving system and converted into a rotational command by an operation of an operator 68, and comprises an attenuation compensation feed-forward operator 64a for a compensation operation such that a doubled value of a product between a differential value of the input variable and a parametrically set value of the torsional attenuation constant ζb is divided by a parametrically set value of the torsional natural frequency ωnb to thereby provide a resultant value as a feed-forward compensation value, and an inertia compensation feed-forward operator 64b which is connected in parallel to the attenuation compensation feed-forward operator 64a and which is adapted for a compensation operation such that a second-order differential value of the input variable is divided by a squared value of the parametrically set value of the torsional natural frequency ωnb to thereby provide a resultant value as a feed-forward compensation value. Respective feed-forward compensation values calculated by operation of the operators 64a and 64b are added to the input variable, to thereby effect a feed-forward compensation.

A result of such a compensation at the second pre-compensator 64 is multiplied by (1/Gr) at an operator 69, to thereby provide an input signal to the third pre-compensator 66.

By the feed-forward compensation at the second pre-compensator 64, there is made a compensation for a torsional deformation error in the torsional system, so that the feed screw is controlled at angular position in accordance with the input variable of the pre-compensator 64.

As shown in FIG. 2, a mechanical position signal obtained at the linear scale 24 is input to a high-cut filter 54 for hybrid control, where such components of the input signal that have frequencies higher than a reciprocal number of a hybrid control time constant T are attenuated to thereby provide an output signal, which is subtracted from a position signal (as a positional command) calculated by an interpolation processor 40 to have a resultant signal to be input to the pre-compensator 60, as an input variable to the first pre-compensator 62 of FIG. 3.

The first pre-compensator 62 is adapted to perform a feed-forward compensation depending on the transmission function Fm2 of the moving system, and comprises an attenuation compensation feed-forward operator 62a for a compensation operation such that a doubled value of a product between a differential value of the input variable to the pre-compensator 62 and a parametrically set value of the attenuation constant ζa of the moving system is divided by a parametrically set value of the natural frequency ωna of the moving system to thereby provide a resultant value as a feed-forward compensation value, and an inertia compensation feed-forward operator 62b which is connected in parallel to the attenuation compensation feed-forward operator 62a and which is adapted for a compensation operation such that a second-order differential value of the input variable is divided by a squared value of the parametrically set value of the natural frequency ωna to thereby provide a resultant value as a feed-forward compensation value. Respective feed-forward compensation values calculated by operations of the operators 62a and 62b are added to the input variable, to thereby effect a feed-forward compensation.

By the feed-forward compensation at the first pre-compensator 62, there is made a compensation for a deformation error in a moving direction of the moving system, so that the mechanical position is controlled in accordance with the input variable to the pre-compensator 62.

Although the case of a hybrid control has been described, the hybrid control time constant T may be an infinity to provide a semi-closed control, or it may be a zero to provide a full-closed control.

Figure 4:
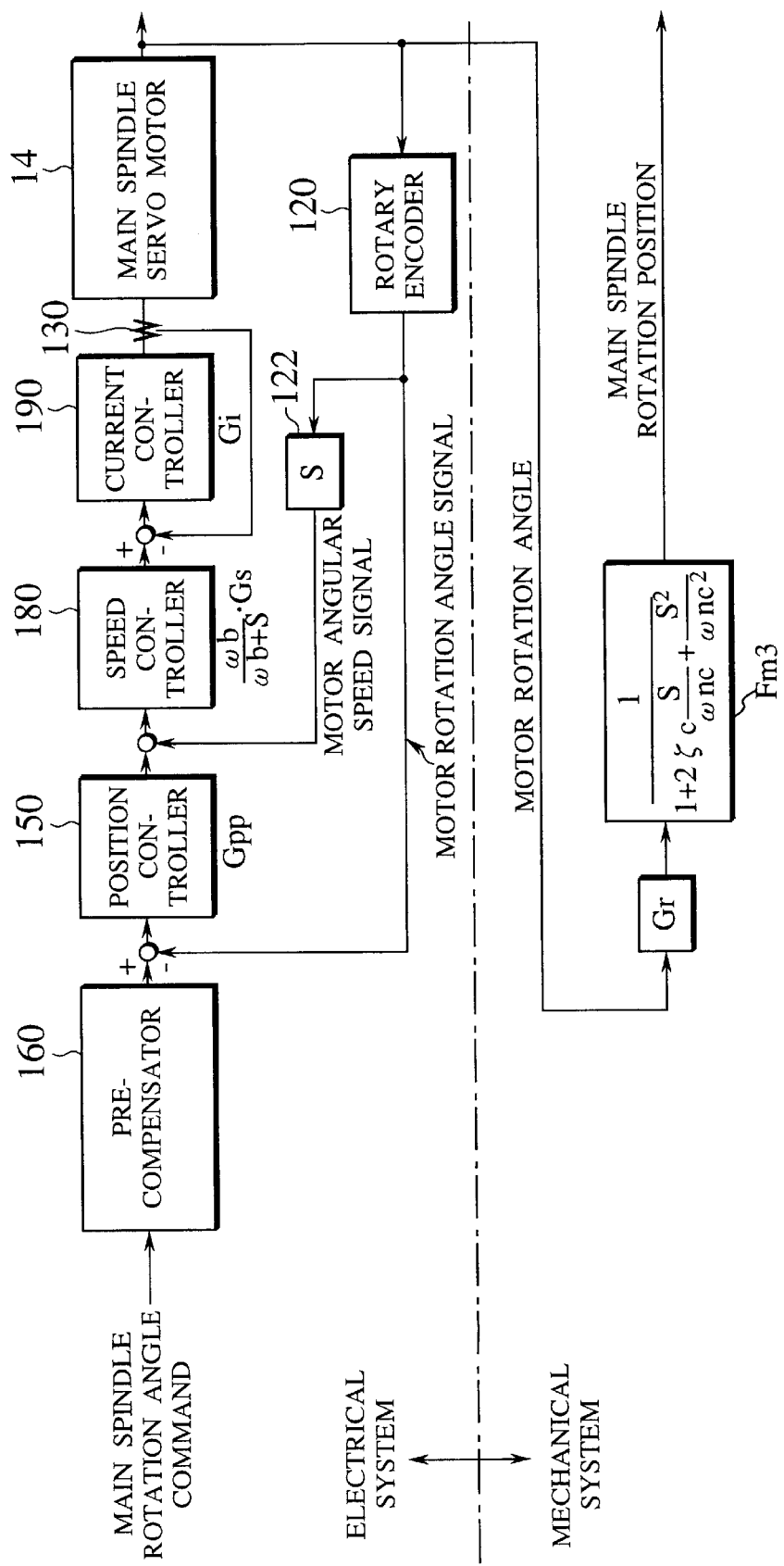
FIG. 4 is a block diagram of a spindle rotation angle control section of the servo control system according to the embodiment.

FIG. 4 shows a servo control section for rotation angle control of the main spindle 1. This control section includes a position controller 150, a pre-compensator 160 as a means for feed-forward compensation in a motor servo system of the spindle 1, a speed controller 180, a current controller 190, and a rotary encoder 120 for outputting a motor rotation angle signal of a main spindle servo motor 14.

The current controller 190 receives a current signal output from a current sensor 130, as a current feedback signal thereto, and constitutes a current loop having a current loop gain Gi.

The motor rotation angle signal (as a spindle rotation angle signal) output from the rotary encoder 120 is differential by a differentiator 122 to obtain a motor angular speed signal, which is given as a speed feedback signal to the speed controller 180. This controller 180 constitutes a speed loop having an incorporated low-pass filter ωb/(ωb+S) and a speed loop gain Gs.

The motor rotation angle signal from the rotary encoder 120 is given as a motor angular position feedback signal to the position controller 150. This controller 150 constitutes a position loop having a position loop gain Gpp.

A rotation of the spindle servo motor 14 is transmitted through a gear reduction ratio Gr to the spindle 1, which is thereby driven for rotation. If the servo motor is directly coupled to the spindle 1, there Gr=1. The rotation of the spindle servo motor is subjected to a transmission function Fm3 of a torsional system, to be given as a rotation angle of the spindle 1.

For discussion of the transmission function Fm3, it is assumed that Jc represents a rotation moment of the spindle 1, Kc represents a torsional rigidity for the elements to be driven for rotation (including a fraction of the torsional rigidity of an associated coupling), and Cc represents an equivalent rotational viscosity coefficient. With respect to torsional vibrations, a natural frequency ωnc can be expressed by an expression (8), and an attenuation constant ζc can be expressed by an expression (9), such that:

$$\omega nc = \sqrt{(Kc/Jc)} \quad (8) \text{ and}$$

$$\zeta c = Cc \cdot \omega nc/2 \quad (9).$$

The transmission function Fm3 of the torsional system is expressed by an expression (10), such that:

$$1/\{1+2\zeta c(S/\omega nc)\}+(S^2/\omega nc^2) \quad (10),$$

where S is a Laplace operator.

Figure 5:
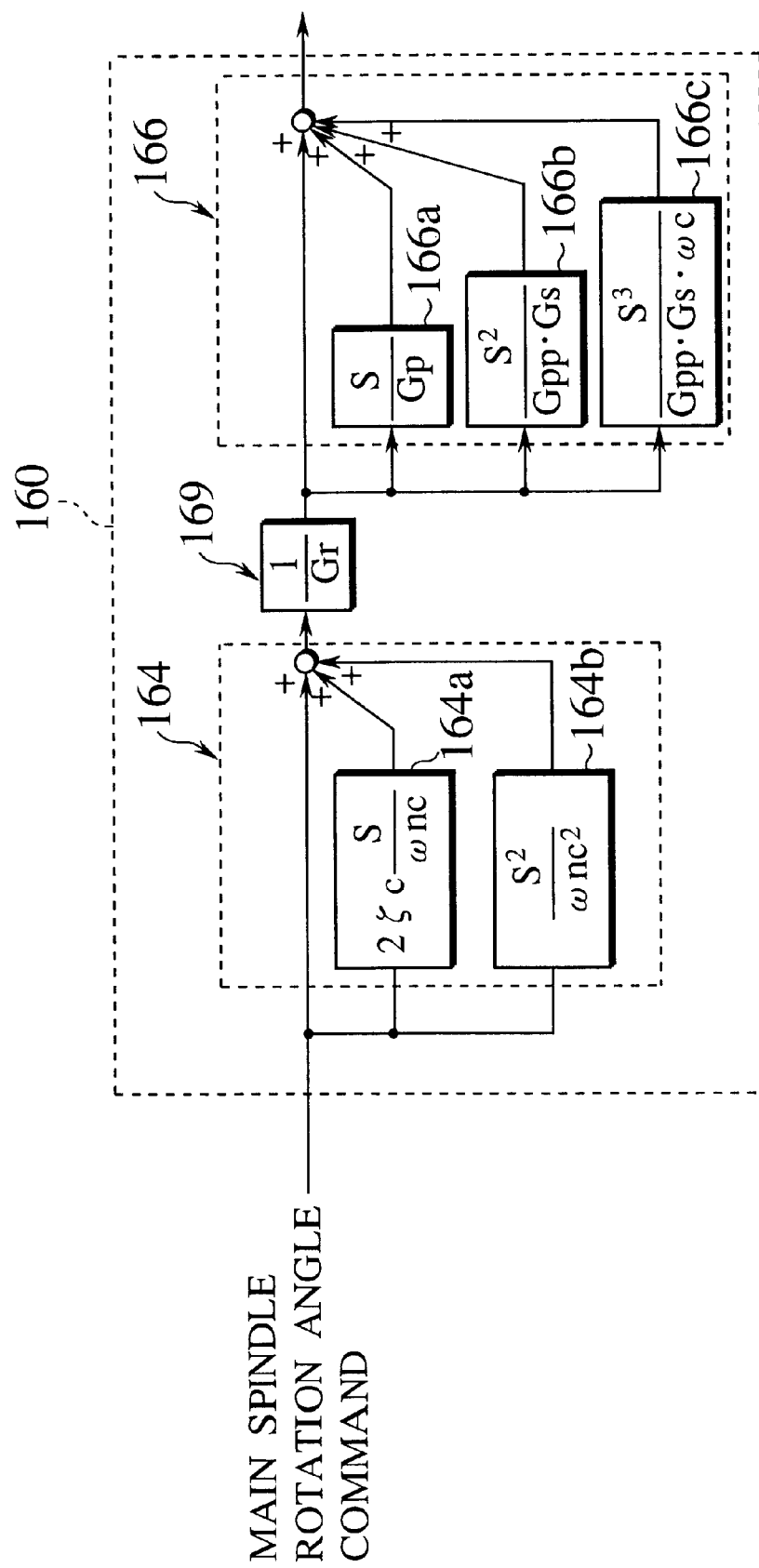
FIG. 5 is a block diagram of an essential component of the spindle rotation angle control section of FIG. 4.

As shown in FIG. 5, the pre-compensator 160, which is a feed-forward compensation means for a motor servo system of the spindle 1, includes a fourth pre-compensator 164 for compensation for an associated torsional system, and a fifth pre-compensator 166 for compensation for the motor servo system.

The fifth pre-compensator 166 comprises a feed-forward compensation operator 166a for a compensation operation of S/Gp to the motor servo system of spindle 1, a feed-forward compensation operator 166b for a compensation operation of $S^2/(Gpp \cdot Gs)$ to the motor servo system, and a feed-forward compensation operator 166c for a compensation operation of $S^3/(Gpp \cdot Gs \cdot \omega c)$ thereto, where ωc is a corner frequency of a low pass compensation filter incorporated in the speed controller 180. Respective feed-forward compensation values calculated by the operations of those feed-forward compensation operators 166a–166c are added to a motor rotation angle command.

By such a compensation of the fifth pre-compensator 166, there is made a feed-forward compensation for a follow-up delay in control of the spindle motor servo system, so that the servo motor 14 is controlled at an angular position in accordance with an input signal (as a spindle rotation angle command) to the pre-compensator 166.

As a result, in addition to the feed-forward compensation for the follow-up delay in control of the feed shaft motor servo system, the follow-up delay in control of the spindle motor servo system is compensated for in a feed forward manner, while a synchronization is secured between the feed shaft control and the spindle rotation angle control.

In the spindle motor servo system, the follow-up delay in control is expressed in terms of an angle θe (see FIG. 1), such that θe=(S/60)(1/Gpp)360°, and a radius reduction amount ΔR due to the follow-up delay angle θe is expressed by an expression (11), such that:

$$\Delta R = R - \sqrt{\{(t\sin\theta e)^2 + (r + t\cos\theta e)^2\}}$$

$$= R - \sqrt{(t^2 + r^2 + 2rt\cos\theta e)} \quad (11),$$

where R is a commanded radius, t is a byte length, and r (see FIG. 1) is a radius of the locus of the center of the spindle 1.

As such, a follow-up delay in control of the spindle motor servo system is compensated for, so that the follow-up delay angle θe=0 and the radius reduction amount ΔR=0.

The fourth pre-compensator 164, which is adapted to perform a feed-forward compensation depending on the transmission function Fm3 of the torsional system, has as an input variable thereto a rotation angle command for the main spindle 1, and comprises an attenuation compensation feed-forward operator 164a for a compensation operation such that a doubled value of a product between a differential value of the input variable and a parametrically set value of the torsional attenuation constant ζc is divided by a parametrically set value of the torsional natural frequency ωnc to thereby provide a resultant value as a feed-forward compensation value, and an inertia compensation feed-forward operator 164b which is connected in parallel to the attenuation compensation feed-forward operator 164a and which is adapted for a compensation operation such that a second-order differential value of the input variable is divided by a squared value of the parametrically set value of the torsional natural frequency ωnc to thereby provide a resultant value as a feed-forward compensation value. Respective feed-forward compensation values calculated by operations of the operators 164a and 164b are added to the input variable, to thereby effect a feed-forward compensation.

A result of such a compensation at the fourth pre-compensator 164 is multiplied by (1/Gr) at an operator 169, to thereby provide an input signal to the fifth pre-compensator 166.

By the feed-forward compensation at the fourth pre-compensator 164, there is made a compensation for a torsional deformation error of the spindle 1, so that the spindle 1 is controlled at a rotation angle position in accordance with the input variable of the pre-compensator 164.

It will be seen that, according to the embodiment, there is disclosed a servo control system (FIGS. 1–5) comprising a first controller (FIG. 2) for controlling a first servo motor (10, 12) for moving a feed shaft (an element as a line segment in the mechanical system of FIG. 2) to feed a work (W), a second controller (FIG. 4) for controlling a second servo motor (14) for moving a spindle (1 or an element as a line segment in the mechanical system of FIG. 4) having a cutting tool (3) attached thereto for an orbital machining (FIG. 1) of the work (W), a first compensator (60, FIG. 3) for compensating for a first follow-up delay in control of the first servo motor (10, 12), in a feed forward manner, and a second compensator (160, FIG. 5) for compensating for a second follow-up delay in control of the second servo motor (14), in a feed forward manner.

The first controller (FIG. 2) includes, as electrical and/or software implements, elements (e.g. 40, 54) for providing a first command (the positional command) responsible for a position (the mechanical position) in feed of the feed shaft, elements (e.g. 50, 52) for subjecting the first command to a first loop (the position loop) having a first gain (Gp), and elements (e.g. 80, 90, 30, 20, 22) for controlling the first servo motor (10, 12) with the first command subjected to the first loop.

The second controller (FIG. 4) includes, as electrical and/or software implements, elements (e.g. 40 of FIG. 2) for providing a second command (the rotation angle command) responsible for a position (e.g. to establish the tip angle β of the cutting tool 3) in rotation of the spindle (1), elements (e.g. 150) for subjecting the second command to a second loop (the position loop) having a second gain (Gpp), and elements (e.g. 180, 190, 130, 120, 122) for controlling the second servo motor (14) with the second command subjected to the second loop.

The first compensator (60) includes, as electrical and/or software implements, elements (66a, 66b, 66c) for calculating a first quantity for compensation depending on a differential (S, $S^2$, $S^3$) of the first command divided by the first gain (Gp), and elements (+) for compensating the first command by the first quantity, and the second compensator (160) includes, as electrical and/or software implements, elements (166a, (166b, 166c) for calculating a second quantity for compensation depending on a differential (S, $S^2$, $S^3$) of the second command divided by the second gain (Gpp), and elements (+) for compensating the second command by the second quantity.

The first compensator (60) further includes, as electrical and/or software implements, elements (62a, 62b) for calculating a third quantity for compensation depending on a differential (S, $S^2$) of the first command and a combination of a natural frequency ($\omega$na) and an attenuation constant ($\zeta$a) of vibrations in a moving direction of a moving mechanism associated with the feed shaft, and elements (+) for compensating the first command by the third quantity.

The first compensator (60) further includes, as electrical and/or software implements, elements (64a, 64b) for calculating a fourth quantity for compensation depending on a differential (S, $S^2$) of the first command and a combination of a natural frequency ($\omega$nb) and an attenuation constant ($\zeta$b) of torsional vibrations of the feed shaft, and elements (+) for compensating the first command by the fourth quantity.

The second compensator (160) also further includes, as electrical and/or software implements, elements (164a, 164b) for calculating a fifth quantity for compensation depending on a differential (S, $S^2$) of the second command and a combination of a natural frequency ($\omega$nc) and an attenuation constant ($\zeta$c) of torsional vibrations of the spindle, and elements (+) for compensating the second command by the fifth quantity.

As will be seen from the foregoing description, according to an aspect of the embodiment, there is provided a servo control method for an orbital machining with a cutting tool, in which a spindle to which a cutting tool is attached and a work to be machined are displaced relative to each other along a plane perpendicular to a rotation axis of the spindle by way of a feed shaft control to achieve a mutual interpolation motion between the spindle and the work, so that a rotation angle of the spindle is synchronously controlled quantitatively, with a predetermined correlation kept to the feed shaft control, and a direction of a blade of the cutting tool relative to a machining surface of the work is maintained in a predetermined direction at any position in rotation of the spindle to cut the work to a shape to be determined by an interpolation locus of the mutual interpolation motion, wherein a follow-up delay in control of a motor servo system for each feed shaft is feed-forward compensated and a follow-up delay in control of a motor servo system for the spindle is feed-forward compensated.

According to this aspect, not only the control follow-up delay of the feed shaft motor servo system but also the control follow-up delay of the spindle motor servo system is feed-forward compensated, so that a synchronization between the feed shaft control and a spindle rotation angle control is ensured.

According to another aspect of the embodiment, there is provided a servo control method for an orbital machining with a cutting tool in which, for a feed-forward compensation of a feed shaft, a feed-forward compensation value determined by a calculation of (a differential value of a positional command value)/(a position loop gain of a feed shaft motor servo system) is added to the positional command value, and for a feed-forward compensation of a spindle, a feed-forward compensation value determined by a calculation of (a differential value of a motor rotation angle command value)/(a position loop gain of a spindle motor servo system) is added to the motor rotation angle command value.

According to this aspect, there is secured a synchronization between the feed shaft control and the spindle rotation angle control.

According to another aspect of the embodiment, there is provided a servo control method for an orbital machining with a cutting tool in which the feed-forward compensation for a feed shaft is performed by having a differential value of a positional command supplied to a position loop of the feed shaft motor servo system as an input variable thereto, calculating a feed-forward compensation value in dependence on the input variable and a combination of parametrically set values of an attenuation constant and a natural frequency of vibrations in a moving direction of a moving system using the feed shaft, and effecting a feed-forward compensation to a command value of the position loop by the feed-forward compensation value.

According to this aspect also, control follow-up delays of the feed shaft motor servo system and the spindle motor servo system are both feed-forward compensated, so that synchronization between the feed shaft control and the spindle rotation angle control are kept. Further, a differential value of a positional command is employed as an input variable and then mechanical errors derived from elastic deformation in a moving direction of the feed shaft due to inertia are compensated for, by a feed-forward compensation employing a feed-forward compensation value determined from the input variable and a parametrically set natural frequency and a parametrically set attenuation constant of vibrations in a moving direction of a moving system including the feed shaft.

According to another aspect of the embodiment, there is provided a servo control method for an orbital machining with a cutting tool in which the feed-forward compensation for a feed shaft is performed by having a differential value of a positional command supplied to a position loop of the feed shaft motor servo system as an input variable thereto, calculating a feed-forward compensation value in dependence on the input variable and a parametrically set natural frequency and a parametrically set attenuation constant of vibrations in a moving direction of a moving system with the feed shaft, and effecting a feed-forward compensation to a command value of the position loop by the feed-forward compensation value.

According to this aspect also, control follow-up delays of the feed shaft motor servo system and the spindle motor servo system are feed-forward compensated, to have an ensured synchronization between the feed shaft control and the spindle rotation angle control. Further, mechanical errors derived from elastic deformation in a moving direction of the feed shaft due to inertia are compensated for. A differential value of the positional command to be supplied to the position loop of the feed shaft motor servo system is employed as an input variable, and mechanical errors derived from elastic deformations of the torsional system of the feed shaft due to inertia are compensated for in a feed forward manner by a feed-forward compensation value determined from the input variable, and a parametric natural frequency and a parametrically set attenuation constant of torsional vibrations of the feed shaft.

According to another aspect of the embodiment, there is provided a servo control method for an orbital machining with a cutting tool in which the feed-forward compensation for a feed shaft is performed by having a differential value of a rotation angle command supplied to a position loop of the spindle motor servo system as an input variable thereto, calculating a feed-forward compensation value in dependence on the input variable, and a parametrically set natural frequency and a parametrically set attenuation constant of torsional vibrations of the spindle, and effecting a feed-forward compensation to an command value of the position loop by the feed-forward compensation value.

According to this aspect also, control follow-up delays of the feed shaft motor servo system and the spindle motor servo system are both feed-forward compensated, to have an ensured synchronization between the feed shaft control and the spindle rotation angle control. Further, a differential value of the rotation angle command to be supplied to the position loop of the spindle motor servo system is employed as an input variable thereto, and mechanical errors derived from elastic deformation of the torsional system of the spindle due to inertia are compensated for in a feed-forward manner by the feed-forward compensation value determined from the input variable, and a parametrically set natural frequency and a parametrically set attenuation constant of torsional vibrations of the spindle.

Further, according to still another aspect of the embodiment, there is provided a servo control system for an orbital machining in which a spindle to which a cutting tool is attached and a work to be machined are displaced relative to each other along a plane perpendicular to a rotation axis of the spindle by way of a feed shaft control to achieve a mutual interpolation motion between the spindle and the work, so that a rotation angle of the spindle is synchronously controlled quantitatively, with a predetermined correlation kept to the feed shaft control, and a direction of a blade of the cutting tool relative to a machining surface of the work is maintained in a predetermined direction at any position in rotation of the spindle to cut the work to a shape to be determined by an interpolation locus of the mutual interpolation motion, the servo control system comprising a feed-forward compensation means for a feed shaft motor servo system for feed-forward compensating a follow-up delay in control of the motor servo system for each feed shaft, and a feed-forward compensation means for a spindle motor servo system for feed-forward compensating a follow-up delay in control of the motor servo system for the spindle.

According to this aspect, not only a control follow-up delay of the feed shaft motor servo system is feed-forward compensated for by the feed-forward compensation means for the feed shaft motor servo system, but also a control follow-up delay of the spindle motor servo system is feed-forward compensated for by the feed-forward compensation means for the spindle motor servo system, to have an ensured synchronization between the feed shaft control and the spindle motor angle control.

According to another aspect of the embodiment, there is provided a servo control system for an orbital machining in which a feed-forward compensation means for the feed shaft motor servo system determines a feed-forward compensation value by a calculation of (a differential value of a positional command value)/(a position loop gain of a feed shaft motor servo system), and a feed-forward compensation means for the spindle motor servo system determines a feed-forward compensation value by a calculation of (a differential value of a motor rotation angle command value)/(a position loop gain of a spindle motor servo system).

According to this aspect, the feed-forward compensation means for the feed shaft motor servo system feed-forward compensates a control follow-up delay of the feed shaft motor servo system by a feed-forward compensation value determined by the calculation of (a differential value of a positional command value)/(a position loop gain of a feed shaft motor servo system), Further, the feed-forward compensation means for the spindle motor servo system feed-forward compensates by a feed-forward compensation value determined by the calculation of (a differential value of a motor rotation angle command value)/(a position loop gain of a spindle motor servo system). As a result, a synchronization between the feed shaft control and the spindle rotation angle control is ensured.

According to another aspect of the embodiment, there is provided a servo control system for an orbital machining in which a differential value of a positional command is supplied to a position loop of the feed shaft motor servo system as an input variable thereto, a feed-forward compensation value is determined in dependence on the input variable, and a parametrically set natural frequency and a parametrically set attenuation constant of vibrations in a moving direction of a moving system with the feed shaft, and a feed-forward compensation is effected to a command value of the position loop by the feed-forward compensation value.

According to this aspect, a synchronization between the feed shaft control and the spindle rotation angle control is ensured by the feed-forward compensation of a control follow-up delay of the feed shaft motor servo system and by the feed-forward compensation of a control follow-up delay of the spindle motor servo system. Further, the feed-forward compensation means for the feed shaft motor servo system employs a differential value of the positional command as an input variable, and performs a feed-forward compensation by a feed-forward compensation value determined from the input variable and a parametrically set natural frequency and a parametrically set attenuation constant of vibrations in a moving direction of the moving system with the feed shaft. Consequently, mechanical errors derived from elastic deformation in the moving direction of the feed shaft due to inertia are compensated for by the feed-forward compensation.

According to another aspect of the embodiment, there is provided a servo control system for an orbital machining in which the feed-forward compensation means for the feed shaft motor servo system calculates, as a differential value of a positional command is supplied to a position loop of the spindle motor servo as an input variable, a feed-forward compensation value in dependence on the input variable, and a parametrically set natural frequency and a parametrically set attenuation constant of torsional vibrations of the feed shaft, and a feed-forward compensation value.

According to this aspect also, a synchronization between the feed shaft control and the spindle rotation angle control is ensured by the feed-forward compensation of a control follow-up delay of the feed shaft motor servo system and by the feed-forward compensation of a control follow-up delay of the spindle motor servo system. Mechanical errors derived from elastic deformation in the moving direction of the feed shaft due to inertia are compensated for. Further, the feed-forward compensation means for the feed shaft motor servo system employs a differential value of the positional command to be supplied to the position loop of the feed shaft motor servo system as the input variable, and effects a feed-forward compensation by a feed-forward compensation value determined from the input variable and a parametrically set natural frequency and a parametrically set attenuation constant of torsional vibrations of the feed shaft. As a result, mechanical errors derived from elastic deformations of the torsional system of the feed shaft due to inertia are also compensated for by the feed-forward compensation.

According to another aspect of the embodiment, there is provided a servo control system for an orbital machining in which the feed-forward compensation means for the feed shaft motor servo system has a differential value of a rotation angle command supplied to a position loop of the spindle motor servo system as an input variable, calculates a feed-forward compensation value in dependence on the input variable, and a parametricallys set natural frequency and a parametrically set attenuation constant of torsional vibration of the spindle, and effects a feed-forward compensation to a command value of the position loop by the feed-forward compensation value.

According to this aspect also, a synchronization between the feed shaft control and the spindle rotation angle control is ensured by the feed-forward compensation of a control follow-up delay of the feed shaft motor servo system and by the feed-forward compensation of a control follow-up delay of the spindle motor servo system. Further, the feed-forward compensation means for the spindle motor servo system employs a differential value of the rotation angle command to be supplied to the position loop of the spindle motor servo system as the input variable, and feed-forward compensates on bases of the input variable and a parametrically set natural frequency and a parametrically set attenuation constant of torsional vibration of the spindle. As a result, mechanical errors derived from elastic deformations of the torsional system of the spindle due to inertia are compensated for by the feed-forward compensation.

While preferred embodiments of the present invention have been described using specific terms, such description is for illustrative purposes, and it is to be understood that changes and variations may be made without departing from the spirit or scope of the following claims.

What is claimed is:

1. A servo control method for orbital machining comprising the steps of:
   moving a spindle and a work by way of a shaft control to make a relative displacement to each other along a plane perpendicular to an axis of rotation of a spindle, such that a mutual interpolation motion is achieved between the spindle and the work;
   controlling a rotation angle of the spindle quantitatively and synchronously to have a predetermined correlation to the shaft control so that, at any angular position in rotation of the spindle, a blade direction of a cutting tool is maintained in a preset direction to thereby achieve a cutting into a configuration to be defined by an interpolation locus based on the mutual interpolation motion;
   controlling a first servo motor for moving a feed shaft to feed the work;
   controlling a second servo motor for moving the spindle having the cutting tool attached thereto for the orbital machining of the work;
   compensating for a first follow-up delay in said controlling of the first servo motor, in a feed forward manner; and
   compensating for a second follow-up delay in said controlling of the second servo motor, in a feed forward manner.

2. The servo control method of claim 1, wherein:
   said controlling the first servo motor includes steps of
   providing a first command responsible for a position in feed of the feed shaft,
   subjecting the first command to a first loop having a first gain, and
   controlling the first servo motor with the first command subjected to the first loop; and
   said controlling the second servo motor includes the steps of
   providing a second command responsible for a position in rotation of the spindle,
   subjecting the second command to a second loop having a second gain, and
   controlling the second servo motor with the second command subjected to the second loop.

3. The servo control method of claim 2, wherein:
   said compensating for the first follow-up delay includes the steps of
   calculating a first quantity for compensation depending on a differential of the first command divided by the first gain, and
   compensating the first command by the first quantity; and
   said compensating for the second follow-up delay includes the steps of
   calculating a second quantity for compensation depending on a differential of the second command divided by the second gain, and
   compensating the second command by the second quantity.

4. The servo control method of claim 3, wherein said compensating for the first follow-up delay includes the steps of:
   calculating a third quantity for compensation depending on a differential of the first command and a combination of a natural frequency and an attenuation constant of vibration in a moving direction of a moving mechanism associated with the feed shaft; and
   compensating the first command by the third quantity.

5. The servo control method of claim 4, wherein said compensating for the first follow-up delay includes the steps of:
   calculating a fourth quantity for compensation depending on a differential of the first command and a combination of a natural frequency and an attenuation constant of torsional vibrations of the feed shaft; and
   compensating the first command by the fourth quantity.

6. The servo control method of claim 5, wherein said compensating for the second follow-up delay includes the steps of:
   calculating a fifth quantity for compensation depending on a differential of the second command and a combination of a natural frequency and an attenuation constant of torsional vibrations of the spindle; and
   compensating the second command by the fifth quantity.

7. A servo control system for orbital machining comprising:
   a first control means for controlling a first servo motor for moving a feed shaft to feed a work;
   a second control means for controlling a second servo motor for moving a spindle having a cutting tool attached thereto for an orbital machining of the work;
   first compensation means for compensating for a first follow-up delay in said first control means for controlling the first servo motor, in a feed forward manner;
   second compensation means for compensating for a second follow-up delay in said second control means for controlling the second servo motor, in a feed forward manner;

moving a spindle and the work by way of a shaft control to make a relative displacement to each other along a plane perpendicular to an axis of rotation of the spindle, such that a mutual interpolation motion is achieved between the spindle and the work; and controlling a rotation angle of the spindle quantitatively and synchronously to have a predetermined correlation to the shaft control so that, at any angular position in rotation of the spindle, a blade direction of a cutting tool is maintained in a preset direction to thereby achieve a cutting into a configuration to be defined by an interpolation locus based on the mutual interpolation motion.

8. The servo control system of claim 7, wherein:

said first control means includes means for providing a first command responsible for a position in feed of the feed shaft, means for subjecting the first command to a first loop having a first gain, and means for controlling the first servo motor with the first command subjected to the first loop; and said second control means includes means for providing a second command responsible for a position in rotation of the spindle, means for subjecting the second command to a second loop having a second gain, and means for controlling the second servo motor with the second command subjected to the second loop.

9. The servo control system of claim 8, wherein:

said first compensation means includes means for calculating a first quantity for compensation depending on a differential of the first command divided by the first gain, and means for compensating the first command by the first quantity; and said second compensation means includes means for calculating a second quantity for compensation depending on a differential of the second command divided by the second gain, and means for compensating the second command by the second quantity.

10. The servo control system of claim 9, wherein said first compensation means includes:

means for calculating a third quantity for compensation depending on a differential of the first command and a combination of a natural frequency and an attenuation constant of vibrations in a moving direction of a moving mechanism associated with the feed shaft; and means for compensating the first command by the third quantity.

11. The servo control system of claim 10, wherein said first compensation means includes:

means for calculating a fourth quantity for compensation depending on a differential of the first command and a combination of a natural frequency and an attenuation constant of torsional vibrations of the feed shaft; and means for compensating the first command by the fourth quantity.

12. The servo control system of claim 11, wherein said second compensation means includes:

means for calculating a fifth quantity for compensation depending on a differential of the second command and a combination of a natural frequency and an attenuation constant of torsional vibrations of the spindle; and means for compensating the second command by the fifth quantity.

13. A servo control method comprising the steps of:

controlling a first servo motor for moving a feed shaft to feed a work;

controlling a second servo motor for moving a spindle having a cutting tool attached thereto for an orbital machining of the work;

compensating for a first follow-up delay in said controlling of the first servo motor, in a feed forward manner; and compensating for a second follow-up delay in said controlling of the second servo motor, in a feed forward manner, wherein:

said controlling of the first servo motor includes the steps of providing a first command responsible for a position in feed of the feed shaft, subjecting the first command to a first loop having a first gain, and controlling the first servo motor with the first command subjected to the first loop; and said controlling the second servo motor includes the steps of providing a second command responsible for a position in rotation of the spindle;

subjecting the second command to a second loop having a second gain, and controlling the second servo motor with the second command subjected to the second loop, wherein said compensating for the first follow-up delay includes the steps of:

calculating a quantity for compensation depending on a differential of the first command and a combination of a natural frequency and an attenuation constant of vibrations in a moving direction of a moving mechanism associated with the feed shaft; and compensating the first command by said quantity.

14. A servo control method comprising the steps of:

controlling a first servo motor for moving a feed shaft to feed a work;

controlling a second servo motor for moving a spindle having a cutting tool attached thereto for an orbital machining of the work;

compensating for a first follow-up in said controlling of the first servo motor, in a feed forward manner; and compensating for a second follow-up delay in said controlling of the second servo motor, in a feed forward manner, wherein:

said controlling of the first servo motor includes the steps of providing a first command responsible for a position in feed of the feed shaft, subjecting the first command to a first loop having a first gain, and controlling the first servo motor with the first command subjected to the first loop; and said controlling the second servo motor includes the steps of providing a second command responsible for a position in rotation of the spindle, subjecting the second command to a second loop having a second gain, and controlling the second servo motor with the second command subjected to the second loop, wherein said compensation for the first follow-up delay includes the steps of:

calculating a quantity for compensation depending on a differential of the first command and a combination of a natural frequency and an attenuation constant of torsional vibrations of the feed shaft; and compensating the first command by said quantity.

15. A servo control method comprising the steps of:

controlling a first servo motor for moving a feed shaft to feed a work;

controlling a second servo motor for moving a spindle having a cutting tool attached thereto for an orbital machining of the work;

compensating for a first follow-up in said controlling the first servo motor, in a feed forward manner; and compensating for a second follow-up delay in said controlling of the second servo motor, in a feed forward manner, wherein:

said controlling of the first servo motor includes the steps of providing a first command responsible for a position in feed of the feed shaft, subjecting the first command to a first loop having a first gain, and controlling the first servo motor with the first command subjected to the first loop; and said controlling of the second servo motor includes the steps of providing a second command responsible for a position in rotation of the spindle, subjecting the second command to a second loop having a second gain, and controlling the second servo motor with the second command subjected to the second loop, wherein said compensating for the first follow-up delay includes the steps of:

calculating a quantity for compensation depending on a differential of the first command and a combination of a natural frequency and an attenuation constant of torsional vibrations of the feed shaft; and compensating the first command by said quantity.

16. A servo control system comprising:

first control means for controlling a first servo motor for moving a feed shaft to feed a work;

second control means for controlling a second servo motor for moving a spindle having a cutting tool attached for an orbital machining of the work;

first compensation means for compensating for a first follow-up delay in control of the first servo motor, in a feed forward manner; and second compensation means for compensating for a second follow-up delay in control of the second servo motor, in a feed forward manner, wherein:

said first control means includes means for providing a first command responsible for a position in feed of the feed shaft, means for subjecting the first command to a first loop having a first gain, and means for controlling the first servo motor with the first command subjected to the first loop; and said second control means includes means for providing a second command responsible for a position in rotation of the spindle, means for subjecting the second command to a second loop having a second gain, and means for controlling the second servo motor with the second command subjected to the second loop, wherein said first compensation means includes:

means for calculating a quantity for compensation depending on a differential of the first command and a combination of a natural frequency and an attenuation constant of vibrations in a moving direction of a moving mechanism associated with the feed shaft; and means for compensating the first command by said quantity.

17. A servo control system comprising:

first control means for controlling a first servo motor for moving a feed shaft to feed a work;

second control means for controlling a second servo motor for moving a spindle having a cutting tool attached thereto for an orbital machining of the work;

first compensation means for compensating for a first follow-up delay in control of the first servo motor, in a feed forward manner; and second compensation means for compensating for a second follow-up delay in control of the second servo motor, in a feed forward manner, wherein:

said first control means includes means for providing a first command responsible for a position in feed of the feed shaft, means for subjecting the first command to a first loop having a first gain, and means for controlling the first servo motor with the first command subjected to the first loop; and said second control means includes means for providing a second command responsible for a position in rotation of the spindle, means for subjecting the second command to a second loop having a second gain, and means for controlling the second servo motor with the second command subjected to the second loop, wherein said first compensation means includes:

means for calculating a quantity for compensation depending on a differential of the first command and a combination of a natural frequency and an attenuation constant of torsional vibrations of the feed shaft; and means for compensating the first command by said quantity.

18. A servo control system comprising:

first control means for controlling a first servo motor for moving a feed shaft to feed a work;

second control means for controlling a second servo motor for moving a spindle having a cutting tool attached thereto for an orbital machining of the work;

first compensation means for compensating for a first follow-up delay in control of the first servo motor, in a feed forward manner; and second compensation means for compensating for a second follow-up delay in control of the second servo motor, in a feed forward manner, wherein:

said first control means includes means for providing a first command responsible for a position in feed of the feed shaft, means for subjecting the first command to a first loop having a first gain, and means for controlling the first servo motor with the first command subjected to the first loop; and said second control means includes
means for providing a second command responsible for a position in rotation of the spindle,
means for subjecting the second command to a second loop having a second gain, and
means for controlling the second servo motor with the second command subjected to the second loop, wherein said second compensation means includes:

means for calculating a quantity for compensation depending on a differential of the second command and a combination of a natural frequency and an attenuation constant of torsional vibrations of the spindle; and means for compensating the second command by said quantity.

* * * * *